(12) United States Patent
Twerdochlib

(10) Patent No.: US 6,895,131 B1
(45) Date of Patent: May 17, 2005

(54) HERMETIC SEAL FOR USE IN CONVERTING OPTICAL SIGNALS TO ELECTRICAL SIGNALS

(75) Inventor: Michael Twerdochlib, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/729,197

(22) Filed: Dec. 5, 2003

(51) Int. Cl.$^7$ .............................................. G02B 6/00
(52) U.S. Cl. ............................ 385/12; 73/651; 73/653
(58) Field of Search ............... 385/12, 13; 73/651–653; 362/157–58, 192

(56) References Cited

U.S. PATENT DOCUMENTS

| | | | | |
|---|---|---|---|---|
| 4,218,614 A | * | 8/1980 | Miller | 250/231.1 |
| 4,302,813 A | * | 11/1981 | Kurihara et al. | 702/56 |
| 4,321,464 A | * | 3/1982 | Miller | 250/231.1 |
| 4,505,991 A | * | 3/1985 | Weber | 429/11 |
| 4,872,348 A | * | 10/1989 | Curry | 73/653 |
| 5,118,189 A | * | 6/1992 | Sanders et al. | 356/470 |
| 5,658,364 A | | 8/1997 | DeVore et al. | |
| 5,684,718 A | * | 11/1997 | Jenkins et al. | 702/57 |
| 5,815,619 A | | 9/1998 | Bloom | |
| 6,196,553 B1 | | 3/2001 | Arab-Sadeghabadi et al. | |
| 6,292,615 B1 | | 9/2001 | Merritt et al. | |
| 6,624,542 B1 | * | 9/2003 | Gabrys et al. | 310/54 |
| 6,770,186 B2 | * | 8/2004 | Rosenfeld et al. | 205/343 |

* cited by examiner

*Primary Examiner*—Brian Healy
*Assistant Examiner*—Derek L. Dupuis

(57) ABSTRACT

The present invention provides a configuration where all optical parts of a monitoring system are contained within a seal and within the generator itself. Non-optical preamplifier functions may also be placed within the seal. In this configuration there is an electrical rather than optical feed-through at the generator wall, which is hermetically sealed, unlike a fiber optic feed-through. The fiber optic light source and detector for each sensor is located in the seal on the generator side of the hermetic electrical feed-through. Electrical power and the sensor's converted electrical vibration signals pass through the electrical feed-through to preamplifier circuitry on the outside of the seal where direct electrical connection is then made to a main chassis unit.

19 Claims, 3 Drawing Sheets

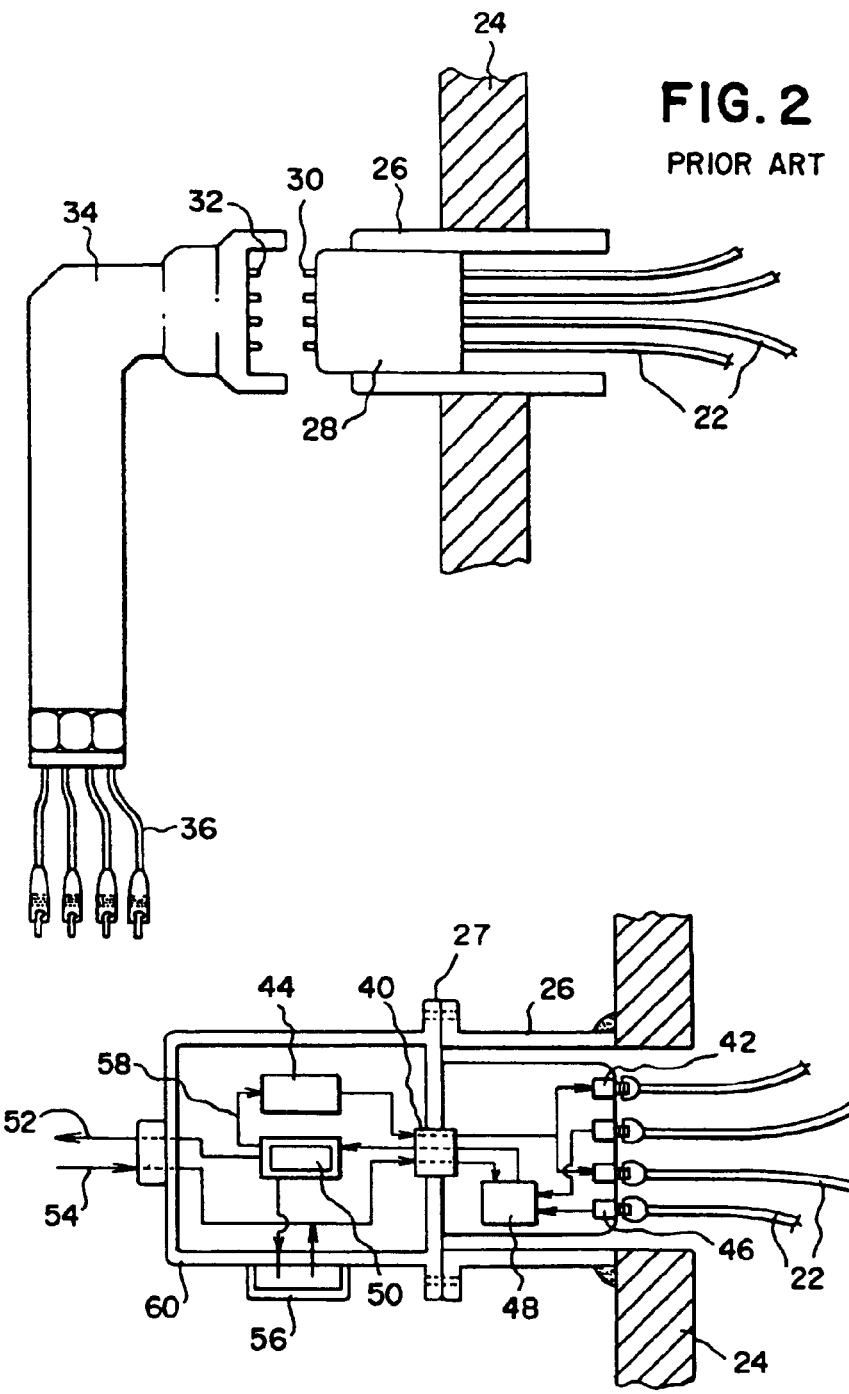

HERMETIC SEAL FOR USE IN CONVERTING OPTICAL SIGNALS TO ELECTRICAL SIGNALS

BACKGROUND OF THE INVENTION

Vibration detection in generators is of the utmost importance in monitoring their efficiency and safety. Severe vibration can cause excessive ware and damage to the generator, resulting in down time, and possible destruction of parts in the generator.

Current state-of-the art vibration detectors use fiber optic sensors mounted within the generator, usually on a stator coil end-turn. An example of a fiber optic sensor can be seen in FIG. 1. As vibrations occur, a sensor reed 14 mounted 12 within the sensor box 10 vibrates. Fixed at the end of the sensor reed is a grid 2 that physically passes through a gap 6 in a fiber optic cable 8. As the grid vibrates at the end of the sensor reed, the light passing through the grid is amplitude and frequency modulated in a measurable manner.

As is now practiced, the fiber optic cable providing light originates from a preamplifier unit outside the generator. This is passed into the generator shell through a seal, to the vibration sensor where it is modulated by the vibration, and then back out through the seal to the preamplifier. A main chassis unit, connected to the preamplifier unit, analyzes the signal from each sensor channel.

FIG. 2 shows a typical set up for passing fiber optic cables through the wall of a generator. The fiber optic cables 22 are gathered at a constructed hole 26, often a welded pipe or welded flanges, in the generator wall 24. Shown here is a simplified diagram where two sensors, resulting in just four cables, are used. Actual generators will have many more sensors in use. In order to maintain pressure inside of the generator, the fiber optic cables need to pass through a seal 28 that is secure enough to withstand the internal pressure from the generator. Unfortunately, fiber optic cables are inherently difficult to pass through a pressure seal, and therefore these seals are weak points in generators and notoriously problematic. Though the fiber optic cables may now be routed directly to a preamplifier, it is common practice to have them terminate 30 outside of the seal for mating with matching fiber optic cables 32. This provides a detachment point if the fiber optic cables, or other generators parts, need to be assembled, fixed or replaced.

Since the fiber optic cables are delicate, and since many generators are outside, the cables are secured within an armored sheath 34. At the terminus of the armored sheath, the fiber optic cables are separated 36 and hooked up with a preamplifier unit (not shown). The preamplifier unit itself needs to be in close proximity to the generator, which usually results in the need for a shed or similar structure to protect the preamplifier unit. At the preamplifier unit, signals from the fiber optic cables are converted to electrical signals for transmission to a main chassis unit.

The fiber optic seal, which essentially requires an individual seal around each fiber optic cable, and mating fiber optic trunk, are costly to make and install. The fiber optic seal is not hermetic and leakage from within the generator poses a major safety issue, especially considering that the generators typically contain 75 pounds per square inch (PSI) hydrogen. Since a single generator can have 12 to 16 vibration sensors, 24 to 32 fiber optic cables, the task of accommodating all of the fiber optic cables is onerous.

What is needed is a seal that reduces the weakness of the fiber optic penetration points through the generators wall, as well as being simpler and more cost effective.

SUMMARY OF THE INVENTION

The present invention provides a configuration where all optical parts of a monitoring system are contained within a seal and within the generator itself. Non-optical preamplifier functions may also be placed within the seal. In this configuration there is an electrical rather than optical feed through at the generator wall, which is hermetically sealed, unlike a fiber optic feed-through. The fiber optic light source and detector for each sensor are located in the seal on the generator side of the hermetic electrical feed-through. Electrical power and the sensor's converted electrical vibration signals pass through the electrical feed-through to preamplifier circuitry on the outside of the seal where a direct connection is then made to a main chassis unit.

In one embodiment a control wire originating externally from the generator controls at least one device within the seal.

In one embodiment, an external display is located on the seal.

In one embodiment the electrical signal is preamplified, and in another embodiment it is amplified.

In one embodiment, multiple electrical wires are combined into fewer wires, and in particular one wire.

In one embodiment multiple seals are used in a single generator and may share tasks.

BRIEF DESCRIPTION OF THE DRAWINGS

FIG. 2 illustrates how fiber optic cables are passed through a generator wall according to the prior art.

FIG. 3 illustrates a hermetic seal according to one embodiment of the present invention.

DETAILED DESCRIPTION OF THE INVENTION

Figure 1:
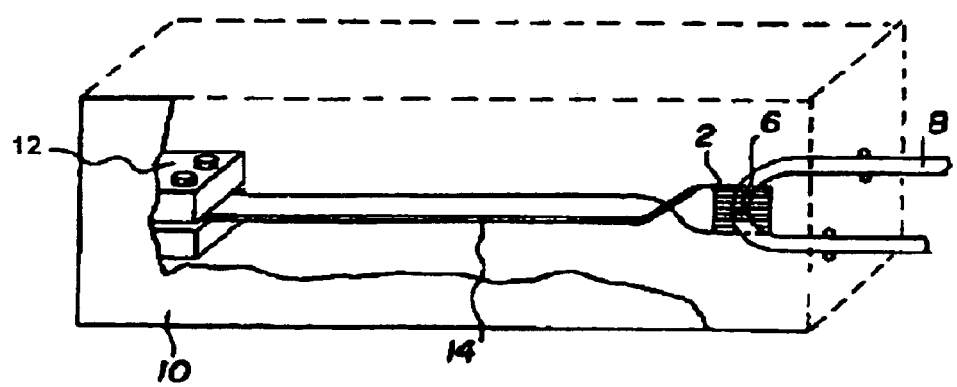
FIG. 1 shows an example of a fiber optic vibration sensor used in generators.

The present invention provides a configuration where all optical parts, such as the optical receiver and source components, of a monitoring system are contained within a connector seal within the generator itself. Non-optical preamplifier functions, like a preamplifier and multiplexer, may also be placed within the seal, or on the outside of the seat depending on need. In these configurations there is an electrical rather than optical feed-through at the generator wall, which provides a hermetically sealed pressure boundary, rather than rubber fiber optic seals that are prone to leaks and require careful alignment of abutting fibers.

The electrical feed-throughs provide a stronger and more reliable seal than the fiber optic feed-throughs, since conductor material like copper diffuses into the intervening glass insulating material. The fiber optic light source and light detector for each sensor is located in the seal on the inside of the hermetic electrical feed-through. Electrical power and the electrical analog sensor signals converted from the vibration light signals, pass through the electrical feed-through to a preamplifier circuitry on the outside of the seal. This may then be in direct electrical connection with a main chassis unit. The term seal as used herein refers to connector seals. The term hermetic seal refers to the specific point at which a wire hermetically crosses the boundary from the inside of the generator to the outside.

FIG. 3 illustrates one embodiment of the present invention. The pressure boundary of the generator is shown by element 27, with all elements to the right being referred to as the generator side and all elements to the left referred to as the outside. Though the seal here is shown protruding from the generator, with the generator side elements mostly outside of the boundary of the generator wall 24, this may be varied according to need. The seal may protrude from, be flush with, or recessed into the generator wall. In the embodiment shown, most elements are outside of the generator wall perimeter to afford more space within the generator itself.

At the pressure boundary 27, the electrical wires are passed through a hermetic seal 40. Not only is the seal around the electrical wires stronger than that of a fiber optic seal, the number of pass-throughs may be greatly reduced in part this is due to exporting only the modified signal, as explained above, and not importing the original light signal. However, in addition, multiple modified signals, once reduced to an electrical signal, may be carried by a single electrical wire. This may be done running multiple converted signals at the same time along the wire or by time-sharing the signals. Outside of the pressure boundary, no mating cables are needed, as is required in the case of fiber optic cables to preserve light continuity.

The original light signal is generated within the generator side of the seal 42. Power for this may come from a remote source, but in the embodiment shown, a power supply 44, in particular an LED power supply, is incorporated into the outside of the seal. The power supply may be placed on the generator side of the seal, however it is appreciated that placing the power supply on the outside is more convenient and safer. Once a fiber optic cable transmits the original light signal to a fiber optic vibration sensor (not shown), the modified signal is carried back to a detector 46 in the seal. The detector converts received optical signals into electrical signals. The detector may also include preamplifier functions.

In one embodiment the converted signals are then fed into a multiplexer 48. The multiplexer is one method of reducing multiple wire signals to one wire signal. A multiplexer acts like a switchboard, examining one input at a time, then switching to another input for examination. For example, sensor one may be examined, then sensor two, then sensor three, all of the signals being carried separately along the same output wire. Other methods for reducing multiple signal wires to fewer wires will be apparent to one of ordinary skill in the art. The multiplexer may also amplify the signal as necessary. In this embodiment, the multiplexer is shown on the generator side of the seal. However, the multiplexer may equally be placed on the outside of the seal.

In this embodiment the electrical signal is passed to an amplifier output 50, which in this embodiment is shown on the outside of the seal, but may also be place on the generator side. An example of an amplifier function would be to amplify a microampere signal from the receiver diode. The amplifier output can be converted to a pulses width modulation (PWM) for from about −18 to +18 volts in a variety or formats. Other types of amplifiers would be apparent to one of ordinary skill in the art. Though am amplifier is one embodiment of the present invention, in may not be present in related embodiments or the amplifier function may be incorporated into other elements. The amplifier output then sends the converted information 52 from the fiber optic vibration detectors directly to a main chassis, preferably via a signal wire. Note that the main chassis unit itself may be incorporated into various operational structures, such as a monitoring computer. In a particular embodiment the amplifier also provides automatic gain control 58 for the power supply 44.

In particular embodiments, the seal receives instruction signals and send status signals 54 from and to sources such as the main chassis. This signal may be passed to any or all of the seal elements, such as the multiplexer 48 to control what sensor is being monitored at a given time. This input may be used to control various aspects of the seal from a remote location. Despite being able to monitor the seal and associated fiber optic vibration sensors remotely, is a particular embodiment a local read out/control 56 accompanies the seal. This embodiment may be practiced in conjunction with or instead of a remote controller.

The outside elements discussed above are shown as being encased in or attached to a cover 60. In this embodiment all outside elements are localized and the cover provides protection. This orientation, however, need not always be as such, and various elements may be located in assorted locations relative to the seal.

Figure 4:
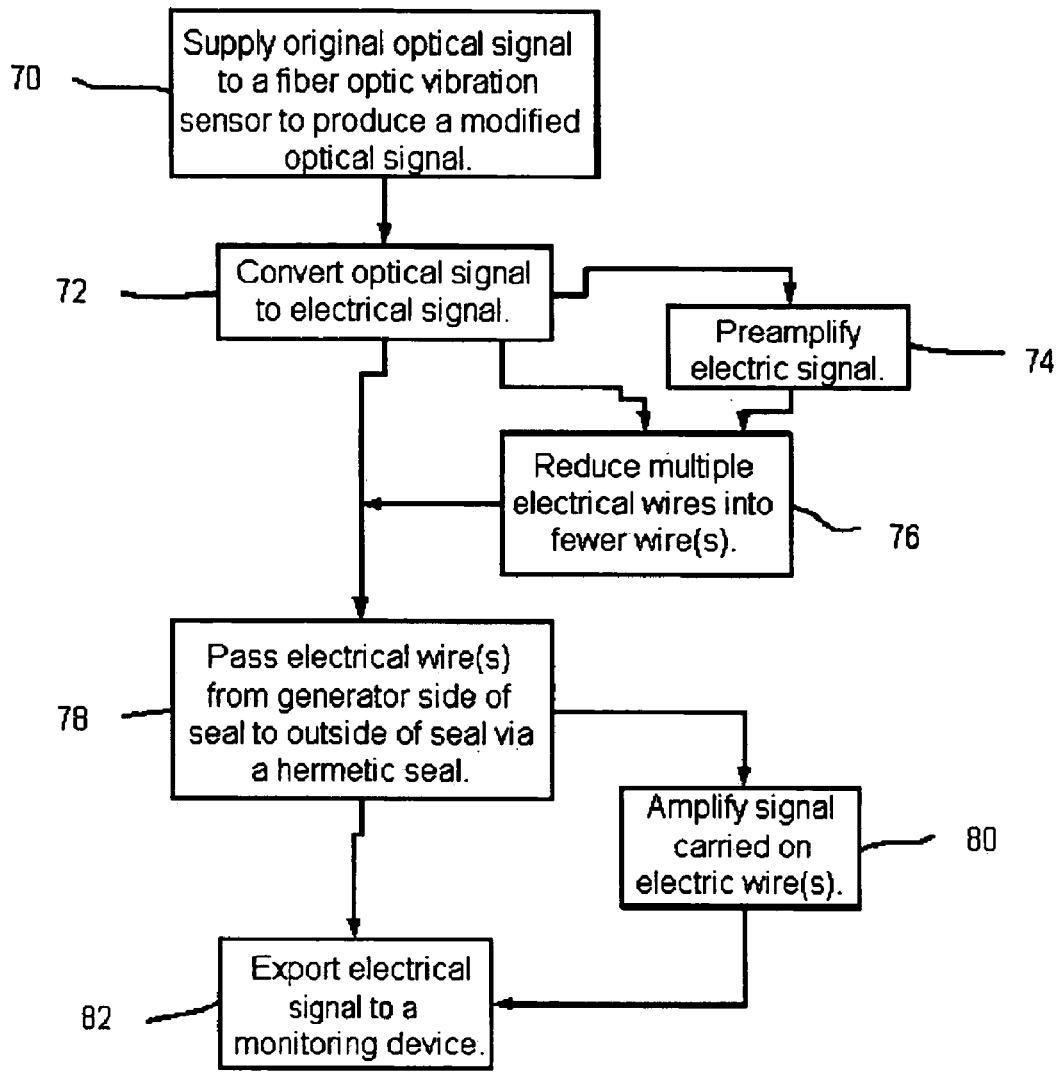
FIG. 4 is a flow chart of various embodiments of the present invention.

FIG. 4 is a flow diagram of various embodiments of the present invention. An original optical signal 70 is provided from the generator side of the seal to a fiber optic vibration sensor. The signal is modified based on vibration to produce a modified signal. The modified optical signal is then sent back to the seal and converted into an electrical signal 72. At this point or at various points thereafter, the signal may be preamplified 74, amplified 80 and/or reduced from multiple electrical wires (from multiple signals) into fewer wires 76. One or more electrical wires are then passed from the generator side of the seal to the outside of the seal via a hermetic seal 78. The signal carried on the electrical wire is then exported to a monitoring device 82 such as a local readout or a remote computer.

In one embodiment the present invention provides for a method of converting a fiber optical signal to an electrical signal inside of a generator. At a fixed location inside of the generator fiber optic transmitters are supplied and connected to fiber optic vibration detectors via fiber optic cables. Optical signals carried along the fiber optic cables are modified by vibrations at the sensors in a measurable manner to produce vibration magnitude signals. The vibration magnitude signals are then sent along more fiber optic cables to be received at a second fixed location inside of the generator. When the vibration magnitude signals are received at the second fixed location they are converted into electrical signals and sent to an electrical wire. The wire is then exported from the generator via a hermetic seal.

In one embodiment the second fixed location has one or more detectors, and the detectors perform the conversion of the optical vibration magnitude signal to the electrical signal. In a particular embodiment the detector preamplifies the electrical signal, which essentially cleans the noise from the signal. In another particular embodiment the detector amplifies the signal.

In one embodiment the electrical signal is preamplified at a point other than the detector, and in another embodiment it is amplified at a point other than the detector.

In one embodiment, when multiple electrical wires are present they may be combined into fewer wires, and in particular one wire. This may be done inside of or outside of the generator, but if done inside of the generator then less electrical wires need to penetrate the seal boundary. As will be appreciated by one of ordinary skill in the art, there are multiple ways to accomplish this, one of them being the use of a multiplexer.

In another embodiment of the present invention a method is provided for monitoring vibration inside of a generator. In this embodiment, a seal is formed in the wall of the generator, where the seal delineates a generator side and an outside. A fiber optic cable is originated at the seal on the generator side. An original optical signal is then transmitted on the fiber optic cable to a vibration sensor where the vibration sensor modifies the original optical signal to produce a modified optical signal. A detector then receives the modified optical signal, the detector being located on the generator side of the seal. The modified optical signal is then converted to an electrical signal and sent along a wire from the generator side to the outside via a hermetic seal; the hermetic seal being part of the aforementioned seal. The wire is then exported to a monitoring device.

In one embodiment multiple seals are used in a single generator and may share tasks. For example, all fiber optic cables may originate at a certain seal, but may return te through a different seal to be converted to electrical signals. In another embodiment a fiber optic cable may originate at a place other than the seal, but will be routed to a seal once vibration detection signal has been produced.

In another embodiment of the present invention a connector seal for converting an optical signal to an electrical signal is provided. The connector seal comprises a seal delineating a boundary between a pressure environment, for example the inside of generator, and a regular environment, for example the outside of a generator. On the pressure side is located one or more detectors that are connected to one or more fiber optic cables. The detectors receive optical signals from the fiber optic cables and convert them into electrical signals for transmission along electrical wires. The wires then hermetically span the boundary. A separate power wire originating on the regular environment side of the seal hermetically spans the boundary and supplies power to at least one object in the seal.

In one embodiment, the object is the detector, but may also be a reducer, preamplifier, amplifier, external monitor or other device. It is worth noting that a variety of these objects may have their functions combined, and may, with the exceptions of the detector and external monitor, be either on the inside or outside of the generator.

In particular embodiments, if preamplifiers and/or amplifiers are provided, the electrical signal is thusly be modified at multiple points within the connector seal or externally to it.

In one embodiment a control wire originating externally from the generator controls at least one device within the connector seal. If the device is on the generator side, the control wire is hermetically passed through the seal to it.

In one embodiment, the fiber optic cable originates at either the connector seal or a neighboring connector seal.

Though a generator is a particular embodiment of the present invention, there are other applications to which this invention may be used that will be apparent to one of ordinary skill in the art.

In another embodiment of the present invention a generator comprises two connector seals for converting an optical signal to an electrical signal. The generator maintains an internal pressure of 75 PSI hydrogen gas. At each end of the generator are 6 to 8 fiber optic vibration sensors, requiring 12 to 16 fiber optic cables. The cables at either end originate on the generator side of the seal, produce a light frequency that gets modified by the fiber optic vibration sensor, and is then routed back to the seal. On the generator side of the seal, the optical signals are converted to electrical analog signals. In a particular embodiment, a single electric wire that spans the seal hermetically, carries all of the fiver optic signals received out of the generator environment.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for converting a fiber optical signal to an electrical signal inside of a generator comprising:
   supplying at least one fiber optic transmitter at a location is internal to the generator;
   connecting to said fiber optic transmitter at least one optic vibration sensor to provide a vibration magnitude signal internal to the generator;
   converting said vibration magnitude signal to an electrical signal on an electrical wire; and
   exporting said electrical signal from said generator via a hermetic seal;
   wherein the environment internal to the generator is at a greater pressure than the environment outside of the generator.

2. The method of claim 1, wherein the environment internal to the generator is substantially hydrogen gas.

3. The method of claim 1, wherein converting said vibration magnitude signal to said electrical signal is performed at a detector.

4. The method of claim 3, wherein said detector preamplifies said electrical signal.

5. The method of claim 1, combining said electrical wire with at least one additional electrical wire into a device, wherein said device has fewer electrical wire outputs than inputs and wherein signals on said electrical wire and said at least one additional electrical wire can be monitored via said electrical wire outputs.

6. The method of claim 5, wherein said device is a multiplexer.

7. The method of claim 5, wherein said device is located internal to said generator.

8. The method of claim 5, wherein said device is located external to said generator.

9. The method of claim 1, further comprising preamplifying said electrical signal.

10. The method of claim 1, further comprising amplifying said electrical signal.

11. A method for monitoring vibration inside of a generator comprising:
    forming a seal on the wall of said generator, wherein said seal delineates a generator side and an outside;
    originating a fiber optic cable at said seal on the generator side;
    transmitting an original optical signal on said fiber optic to a vibration sensor wherein said vibration sensor modifies said original optical signal to produce a modified optical signal;
    receiving at a detector said modified optical signal wherein said detector is located on the generator side of said seal;
    converting said modified optical signal to an electrical signal;
    sending said converted electrical signal to a wire;
    passing said wire from the generator side to the outside via a hermetic seal, wherein said hermetic seal is part of said seal; and
    exporting said wire to a monitoring device.

12. The method of claim 11, wherein multiple seals are used on said generator, wherein the originating and receiving tasks are shared between said multiple seals.

13. A connector seal for converting an optical signal to an electrical signal comprising:
- a seal delineating a boundary between a pressure environment and a regular environment;
- at least one detector on said pressure environment side of said seal;
- at least one fiber optic cable connected to said at least one detector wherein said at least one detector receives an optical signal from said at least one fiber optic and said detector converts said optical signal to an electrical signal;
- at least one wire that originates on said pressure environment side of said seal that hermetically spans said boundary, wherein said at least one wire receives said electrical signal; and
- a power wire originating on said regular environment side of said seal that hermetically spans said boundary and supplies power to at least one object.

14. The method of claim 13, wherein said at least one object is said detector.

15. The method of claim 13, wherein said electrical signal is amplified.

16. The method of claim 13, wherein said at least one object is a reducer.

17. The method of claim 13, wherein said object is a multiplexer.

18. The method of claim 13, wherein a control wire originating on said regular environment side of said seal that hermetically spans said boundary and controls at least one device.

19. The method of claim 13, wherein the number of said at least one wire is equal to or less than the number of said at least one fiber optic.

* * * * *